United States Patent [19]

Goldman et al.

[11] Patent Number: 4,571,766

[45] Date of Patent: Feb. 25, 1986

[54] DEVICE FOR CLEANING THE INTERIOR SURFACE OF AN AQUARIUM

[75] Inventors: Jerome N. Goldman, New York; Marvin A. Goldman, Great Neck; Gerald A. Philips, Glen Cove, all of N.Y.

[73] Assignee: Penn Plax Plastics, Inc., Garden City, N.Y.

[21] Appl. No.: 617,879

[22] Filed: Jun. 6, 1984

[51] Int. Cl.[4] ............................................. A47L 1/06
[52] U.S. Cl. ........................................ 15/105; 15/111; 15/118; 15/244 R; 119/5
[58] Field of Search ............ 15/105, 111, 118, 244 R, 15/244 A; 119/5

[56] References Cited

U.S. PATENT DOCUMENTS

| | | | |
|---|---|---|---|
| 2,323,568 | 7/1943 | Rogers | 15/244 R |
| 2,732,574 | 1/1956 | Gesell et al. | 15/244 R X |
| 2,877,478 | 3/1959 | Kohlwey et al. | 15/244 R X |
| 3,199,139 | 8/1965 | Vallis | 15/118 X |
| 3,204,277 | 9/1965 | Visman et al. | 15/244 R |
| 3,861,993 | 1/1975 | Guthrie | 15/118 X |
| 4,114,224 | 9/1978 | Disko | 15/229 R X |
| 4,455,705 | 6/1984 | Graham | 15/244 A |

FOREIGN PATENT DOCUMENTS 184942  9/1963  Sweden .............................. 15/118

*Primary Examiner*—Chris K. Moore
*Attorney, Agent, or Firm*—R. Scott Goldman

[57] ABSTRACT

A cleaning device adapted for use in cleaning the interior surface of the glass walls of an aquarium fish tank. The device allows for the interchange or replacement of cleaning elements to accommodate the cleaning of the various types of surface deposits which may be found on the interior glass of the aquarium, by removably attaching the cleaning element to the headpiece of the cleaning device. The preferred embodiment of the invention includes an elongated handle, a non-rusting glass scraper, rigid projections from the headpiece to hold the cleaning element in position during use, and a planter feature for pushing aquarium plants and air tubing under the bottom material in the aquarium.

20 Claims, 3 Drawing Figures

U.S. Patent  Feb. 25, 1986  4,571,766
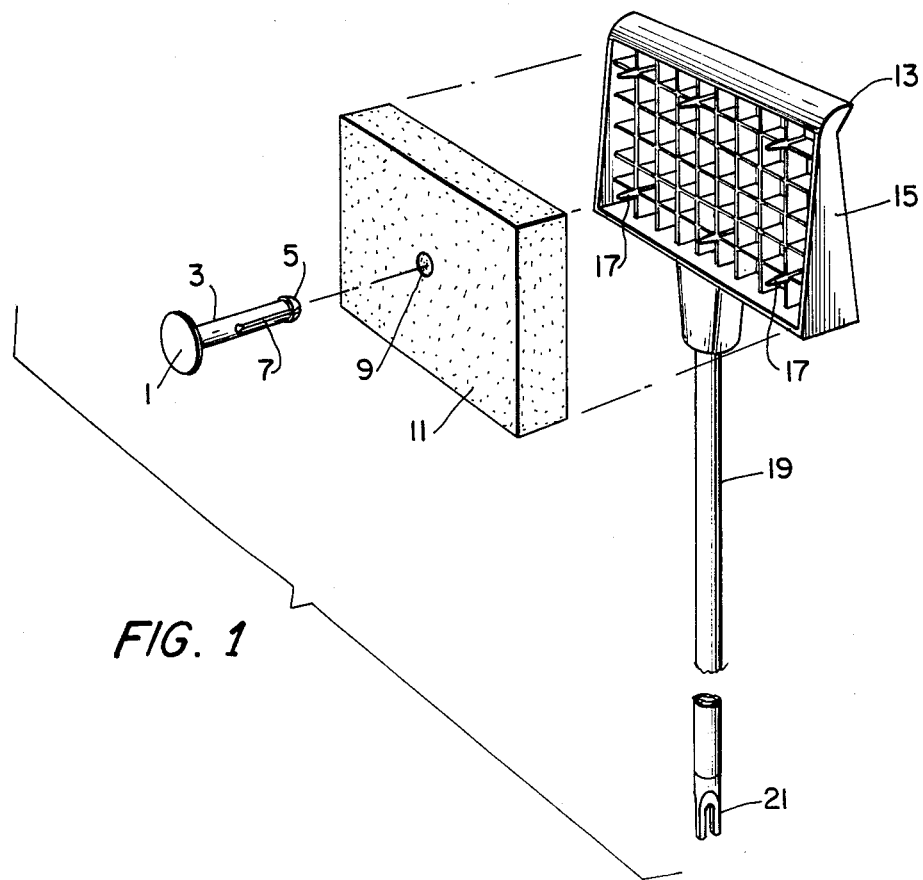
FIG. 1
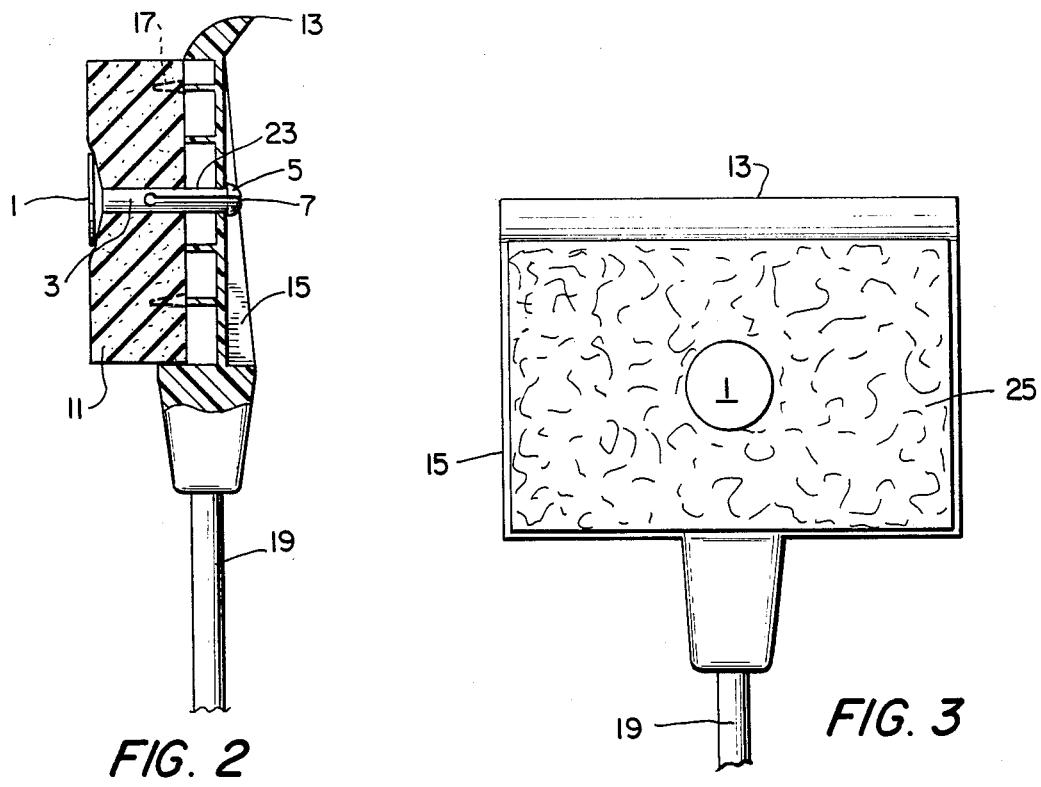
FIG. 2
FIG. 3

DEVICE FOR CLEANING THE INTERIOR SURFACE OF AN AQUARIUM

BACKGROUND OF THE INVENTION

The present invention relates generally to a surface cleaning device. More particularly, this invention relates to a surface cleaning device for use in cleaning off algae, film and other accumulated deposits from the inside surface of aquarium fish tanks.

The present invention finds use in cleaning different types of surface deposits from the inside of aquarium fish tanks without scratching the surface. It finds its primary use for the general upkeep of aquariums in the home hobbyist, research, or commercial setting. Cleaning deposits from the inner surface of an aquarium fish tank is normally required on a regular basis. These deposits vary in type and the method required for removal. For example surface deposits on the interior surface of the aquarium tank may range from easy to remove soft algae and film to the hardest algae and deposits. The same aquarium may have different types of surface deposits on different parts of the interior surface of the tank. Also, during the cleaning process the cleaning elements of cleaning devices are often soiled by the surface deposits to an extent where they are not suitable for further use. The cleaning elements must then be replaced.

Furthermore, in many instances, the keeper of an aquarium desires to clean the interior wall of the aquarium without having his hands contact the aquarium water. In a preferred embodiment this invention permits the interior surface of the aquarium to be cleaned without requiring the user's hands to contact the aquarium water. This embodiment is particularly suited for use by the home hobbyist.

The aquarium keeper also finds it necessary to push the root systems of natural plants or the bases of artificial plants under the surface of the aquarium bottom material to secure their position in the tank. Additionally, it is also necessary to push aquarium air tubing under the bottom material of the aquarium and to move objects to different places in the aquarium. In another preferred embodiment, the present invention also finds use as a device for planting both live and artificial aquarium plants without requiring the users hands to contact the aquarium water. It may also be used to bury aquarium air line tubing, and to move objects around the tank while the users hand remains out of the water.

Several devices are known in the art for cleaning the interior surface of aquariums. These devices include cleaners with a plastic shaft, a razor scraper at an angle and a planter element. Also known is a device with a sponge attached to a stick and a plastic scraper on a shaft. These and other devices are manufactured by a number of companies in the aquarium field and are generally available to the aquarium hobbiest.

The known devices for cleaning the aquarium inner surface do not provide sufficient choice of cleaning elements in order to be used for cleaning all types of aquarium surface deposits. An aquarium keeper is therefore required to use different cleaning devices to clean different types of surface deposits. Also the known devices have cleaning elements which are permanently secured in place. Therefore, the entire device must be replaced once the cleaning element is soiled beyond further use. Additionally none of the known devices combine the advantages of a choice of cleaning elements, a scraping surface and the ability to use the device for securing plants and aquarium air tubing in the tank.

The present invention is particularly well suited as an aquarium cleaner since it allows the user to clean a variety of different surface deposits with a single device by simply changing the cleaning element used on the device. Additionally, it allows the aquarium keeper to replace only the cleaning elements which are soiled beyond further use, while retaining the permanent headpiece and handle.

SUMMARY OF THE PRESENT INVENTION

It is an object of the present invention to provide a device for cleaning a variety of deposits from the interior surface of an aquarium fish tank without scratching the surface contacted by the cleaning element.

It is a another object of the present invention to provide a device for cleaning the interior surface of an aquarium having a simple and easy to use mechanism for interchanging and securing cleaning elements, depending upon the type of deposit on the interior wall of the aquarium.

It is a further object of the present invention to provide a cleaning device for the interior surface of an aquarium which will not require replacement of the entire device after the cleaning element is soiled beyond further use.

It is a still further object of the present invention to provide a device for cleaning the interior surface of an aquarium without placing ones hands into the aquarium water, which allows both the choice of cleaning elements, a scraping surface, and a planter feature for use in placing plants and aquarium air tubing under the surface of the bottom material of an aquarium tank.

The present invention is a cleaning device for removing deposits which accumulate upon the interior surface of an aquarium. It offers interchangeable cleaning elements which may be changed to accommodate differences in the surface deposits to be cleaned. The cleaning elements may also be removed and disposed of after they are no longer usable and new cleaning elements may be placed on the permanent headpiece and handle of the cleaning device.

The cleaning device of the present invention comprises a headpiece which serves as a base for interchangeable cleaning elements, a handle attached to the headpiece to allow the user to grasp the cleaning device, interchangeable cleaning elements removably attached to the headpiece, and a fastening means for securely attaching the cleaning elements to the headpiece.

The cleaning device may further comprise a scraping element formed on or attached to the headpiece for removing hardened algae and other hard to remove deposits from the surface of the aquarium. It is preferable if this scraping element is non-rusting.

The cleaning device may further comprise a means to hold the cleaning element in position and maintain its shape while the cleaning device is in use. This object may be accomplished by the addition of more than one fastening device, backing the cleaning element with a friction material to reduce slippage, or any like means which would serve the purpose. In the embodiment of the drawings rigid retaining points project from the headpiece for this purpose.

The cleaning device may further comprise a planting end piece attached to the handle or headpiece for use in placing plant roots or bases, air tubing and the like under the surface of the bottom material of the aquarium fish tank, and for moving objects around in the aquarium. This end piece should be of a shape which would facilitate grasping the plant bottoms or air tubing. In the embodiment pictured in the drawings, this planter end piece is a forked two pronged projection off the bottom end of the handle.

The face of the headpiece on which the cleaning elements are attached should be about the same size as the cleaning elements and of sufficient size to support the entire surface of the cleaning element. It must be rigid and yet light enough so as not to be cumbersome during use. It should be made from a non-rusting, non-corrosive material of sufficient strength to withstand the force generated while the aquarium surface is scrubbed. The preferable material for producing the headpiece is plastic, although wood, aluminum and the like may be suitable.

The cleaning elements must be made of a material which will not scratch the interior surface of the aquarium and yet clean a varying range of surface deposits. The size of the cleaning elements is not critical unless it interferes with the ability to clean the interior surface of the aquarium. It is preferable if they are approximately 1 to 4 inches in surface dimensions and about 0.25 to 1 inch in depth. The cleaning elements must also be capable of being attached to the headpiece in a removable manner. Sponges of varying coarseness are preferable cleaning elements.

The handle can be of any form which allows the user to grasp the cleaning device at the time of use. It is preferred if the handle is of sufficient length so that the device may be used with the users hands out of the water when the cleaning elements are cleaning near the bottom of the aquarium. To accomodate a variety of popular aquarium depths a handle length in the range of 10 to 18 inches is preferred. The handle may be formed from wood, aluminum and the like. However, it is preferable for aquarium use if the handle is formed from plastic. Additionally, it is preferable for the handle to be a narrow flexible semi-rigid shaft or cylinder and for it to be slightly bent. These features allow the handle to apply sufficient pressure for cleaning and to withstand this pressure without breaking.

The fastening means must hold the cleaning elements in place on the headpiece. It must function in such a way as to allow fast and easy interchange of the cleaning elements. It must also be durable enough to withstand prolonged use in aquarium water. Additionally, the fastening means must either be on the back of the cleaning element or be recessed below the cleaning surface of the cleaning element in order to avoid scratching the surface of the aquarium. Typical fasteners which are suitable for use in the present invention may include plastic snaps, nut and bolt systems and velcro and the like.

It has been determined that spring fish hook design pop it plastic fasteners are preferable for use because of their durability, and ease and quickness of use when interchanging cleaning elements. The fastening piece can be made to fit into a single back hole on the headpiece. A split in the shaft of the fastening piece gives it a springing action. These fastening pieces pop out with little pressure on their rear end and without tools. However, they will not fall out on their own. The head ends of these fastening pieces may be recessed below the surface of the cleaning element by varying the length of the shaft of the fastening piece so that it is shorter than the depth of the cleaning element.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 is an exploded perspective view of the preferred embodiment of the present invention.

FIG. 2 is a side view of the headpiece and cleaning element of the present invention when ready for use.

FIG. 3 is a view of the front of the headpiece with a cleaning element ready for use.

Like references refer to like parts throughout the several views of the drawings.

DETAILED DESCRIPTION OF THE PREFERRED EMBODIMENT

FIG. 1 shows an exploded, perspective view of the preferred embodiment of the present invention. The headpiece represented by numeral 15, is adapted so that a fish hook design pop-it fastener 3 may be inserted. The headpiece can have a scraping edge 13 formed thereon and rigid projections 17 protruding from the surface of the headpiece. The headpiece in this embodiment also has formed thereon a handle 19.

The handle 19 may be elongated and attached in such a way so that it projects from the headpiece 15 at a slight angle. A two pronged planting element 21 may be attached to the bottom end of the handle 19.

A cleaning element 11 is attached to the headpiece 15 and contacts the rigid projections 17 protruding from the headpiece. The cleaning element has a hole through the center 9 which allows the fastener 3 to pass through the cleaning element 11 up to the point of the head of the fastener 1. The fastener 3 illustrated in this embodiment is the preferred fishhook design springing pop it type fastener with a slit 7 projecting towards the head of the fastener 1 from the expanded point of the fastener 5.

FIG. 2 illustrates that the fastener 3 passes through the hole 23 in the headpiece 15 and the expanded point 5 of the fastener 3 secures the cleaning element to the headpiece 15. When the headpiece 15 and cleaning element 11 are in place and ready for use the head 1 of the fastener 3 is recessed below the level of the surface of the cleaning element 11. When the cleaning element 11 is in place the rigid projections 17 project into the cleaning element 11 to hold it in position on the headpiece 15. The scraping edge 13 of the headpiece 15 is also seen in side view.

FIG. 3 illustrates the front or cleaning surface of the cleaning element 25. Cleaning element 25 is illustrated as a coarse sponge. Also visible is the back of scraping element 13 formed on the edge of the headpiece 15, and the head 1 of the fastener 3.

It is readily apparent that the above-described cleaning device meets all the objectives mentioned and also has the advantage of a wide range of use for the aquarium. It should be understood that the specific form of the invention hereinabove described is intended to be representative only, as certain modifications within the scope of these teachings will be apparent to those skilled in the art of aquarium cleaning devices.

Accordingly, reference should be made to the following claims in determining the full scope of the invention.

What is claimed:

1. A device for cleaning the interior surface of an aquarium which comprises,
   (a) a headpiece,
   (b) a handle attached to the headpiece,
   (c) one or more cleaning elements which are removably attached to the headpiece,
   (d) a means for removably attaching the cleaning element to the headpiece and,
   (e) a planting end piece adapted for pushing the bases and roots of aquarium plants, and aquarium air tubing under the surface of the bottom material of the aquarium, attached to the bottom end of the handle.

2. A device for cleaning the interior surface of an aquarium as in claim 1, wherein the fastening means is recessed below the surface of the cleaning element.

3. A device for cleaning the interior surface of an aquarium as in claim 2, wherein the elongated handle comprises a cylindrical tube.

4. A device for cleaning the interior surface of an aquarium as in claim 1, wherein the fastening means is attached behind the cleaning surface of the cleaning element.

5. A device for cleaning the interior surface of an aquarium as in claim 1, wherein the fastening means is a fish hook design pop-it fastener.

6. A device for cleaning the interior surface of an aquarium which comprises,
   (a) a headpiece,
   (b) an elongated handle of between 10 to 18 inches in length,
   (c) one or more cleaning elements which are removably attached to the headpiece,
   (d) a means for removably attaching the cleaning element to the headpiece,
   (e) a scraper element formed on the headpiece, and,
   (f) a planting end piece adapted for pushing the bases and roots of aquarium plants, and aquarium air tubing under the surface of the bottom material of the aquarium, attached to the bottom end of the handle.

7. A device for cleaning the interior surface of an aquarium as in claim 6, wherein the cleaning elements are any one of a plurality of pads formed from sponges of varying coarseness.

8. A device for cleaning the interior surface of an aquarium as in claim 1, which further comprises a scraper element formed on the headpiece.

9. A device for cleaning the interior surface of an aquarium as in claim 1, which further comprises a means for maintaining the shape and position of the cleaning element on the headpiece.

10. A device for cleaning the interior surface of an aquarium as in claim 9, wherein the means for maintaining the shape and position of the cleaning element on the headpiece comprises a plurality of rigid points projecting from the headpiece.

11. A device for cleaning the interior surface of an aquarium as in claim 10, wherein the fish hook design pop-it fastener has a split down the shaft.

12. A device for cleaning the interior surface of an aquarium as in claim 6, wherein the planting end piece comprises a forked, two prong projection.

13. A device for cleaning the interior surface of an aquarium as in claim 6, wherein the fastening means is recessed below the surface of the cleaning element.

14. A device for cleaning the interior surface of an aquarium as in claim 6, wherein the fastening means is attached behind the cleaning surface of the cleaning element.

15. A device for cleaning the interior surface of an aquarium as in claim 6, wherein the fastening means is a fish hook design pop-it fastener.

16. A device for cleaning the interior surface of an aquarium as in claim 15, wherein the fish hook design pop-it fastener has a split down the shaft.

17. A device for cleaning the interior surface of an aquarium as in claim 1, wherein the cleaning elements are any one of a plurality of pads formed from sponges of varying coarseness.

18. A device for cleaning the interior surface of an aquarium as in claim 6, which further comprises a means for maintaining the shape and position of the cleaning element on the headpiece.

19. A device for cleaning the interior surface of an aquarium as in claim 18, wherein the means for maintaining the shape and position of the cleaning element on the headpiece comprises a plurality of rigid points projecting from the headpiece.

20. A device for cleaning the interior surface of an an aquarium which comprises,
    (a) a headpiece,
    (b) an elongated handle in the form of a cylindrical tube, of between 10 and 18 inches in length, attached to the headpiece,
    (c) a planting end piece attached to the bottom end of the handle in the form of a forked, two prong projection,
    (d) a cleaning element which is removably attached to the headpiece,
    (e) a means for removably attaching the cleaning element to the headpiece, which is recessed below the surface of the cleaning element,
    (f) a means for maintaining the shape and position of the cleaning element on the headpiece, and,
    (g) a non-rusting scraper element formed on the headpiece.

* * * * *